(12) United States Patent
Kim

(10) Patent No.: US 12,323,958 B2
(45) Date of Patent: Jun. 3, 2025

(54) METHOD FOR TRANSMITTING/RECEIVING DATA IN WIRELESS COMMUNICATION SYSTEM SUPPORTING FULL DUPLEX COMMUNICATION, AND APPARATUS THEREFOR

(71) Applicant: LG ELECTRONICS INC., Seoul (KR)

(72) Inventor: Donggeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 387 days.

(21) Appl. No.: 17/925,866

(22) PCT Filed: Jun. 2, 2020

(86) PCT No.: PCT/KR2020/007101
§ 371 (c)(1),
(2) Date: Nov. 17, 2022

(87) PCT Pub. No.: WO2021/246541
PCT Pub. Date: Dec. 9, 2021

(65) Prior Publication Data
US 2023/0189229 A1    Jun. 15, 2023

(51) Int. Cl.
*H04W 72/04* (2023.01)
*H04L 1/1812* (2023.01)
(Continued)

(52) U.S. Cl.
CPC ....... *H04W 72/0453* (2013.01); *H04L 1/1812* (2013.01); *H04W 72/23* (2023.01)

(58) Field of Classification Search
CPC .. H04W 72/0453; H04W 72/23; H04L 1/1812
See application file for complete search history.

(56) References Cited

U.S. PATENT DOCUMENTS 9,350,477 B1    5/2016  Jung et al.
2016/0374084 A1*  12/2016  Zhang ............... H04W 72/0453
(Continued)

FOREIGN PATENT DOCUMENTS

KR            101952898 B1    2/2019
KR         1020190016548 A    2/2019
(Continued)

*Primary Examiner* — Brenda H Pham
(74) *Attorney, Agent, or Firm* — BRYAN CAVE LEIGHTON PAISNER LLP

(57) ABSTRACT

The present document discloses a method by which a terminal transmits/receives a signal in a wireless communication system, comprising the steps of: receiving frequency configuration information from a base station; receiving a control channel including downlink control information (DCI) from the base station; receiving a downlink signal from the base station on the basis of the DCI; and transmitting a hybrid automatic repeat and request acknowledgement/negative-acknowledgement (HARQ-ACK/NACK) in response to the downlink signal received from the base station, wherein the frequency configuration information includes information about length L of a predetermined frequency resource from the lowest frequency at which the downlink signal is received and information about length R of a predetermined frequency resource from the highest frequency at which the downlink signal is received, and the DCI includes indices indicating lengths L and R.

12 Claims, 20 Drawing Sheets

(51) Int. Cl.
 *H04W 72/0453* (2023.01)
 *H04W 72/23* (2023.01)

(56) References Cited

U.S. PATENT DOCUMENTS

2019/0103943 A1\* 4/2019 Wang .................... H04L 1/1854
2020/0213044 A1\* 7/2020 Peng .................... H04L 1/1864
2021/0321445 A1\* 10/2021 Yang .................... H04L 1/1854

FOREIGN PATENT DOCUMENTS

KR   1020190128220 A   11/2019
WO      2019098395 A1    5/2019

\* cited by examiner

[Figure 1]
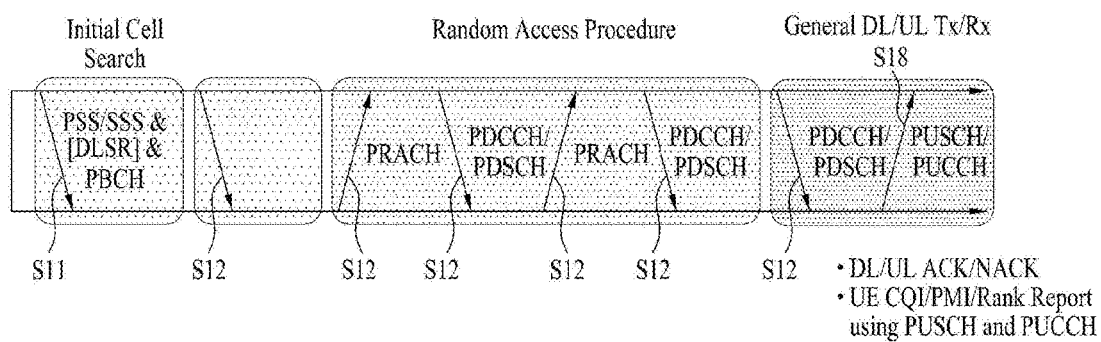

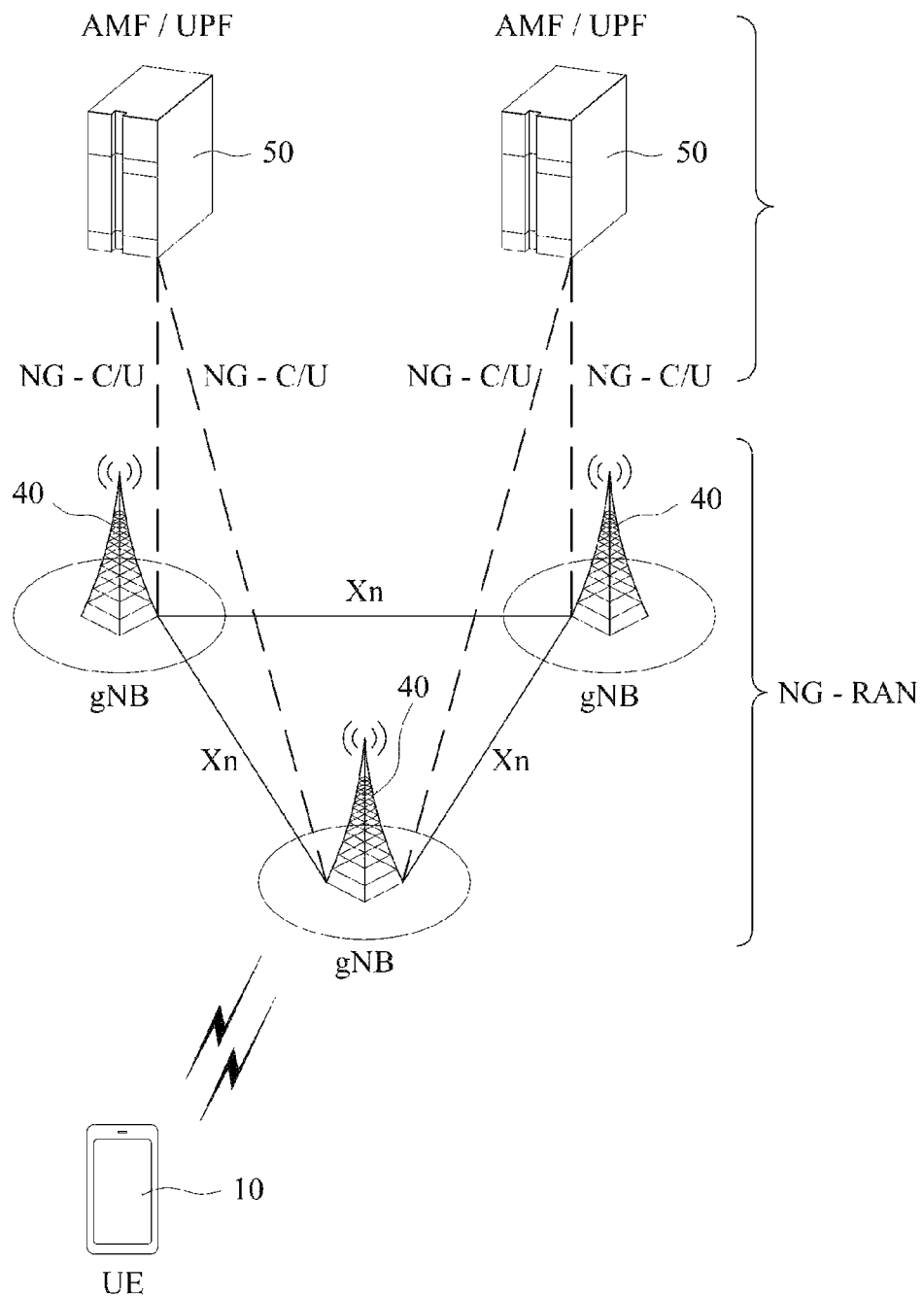
[Figure 2]

[Figure 3]
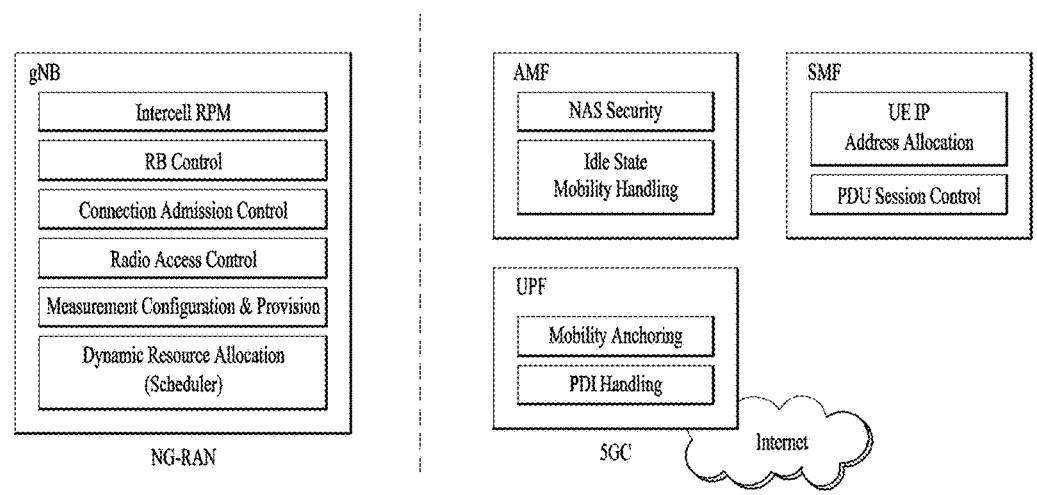

[Figure 4]
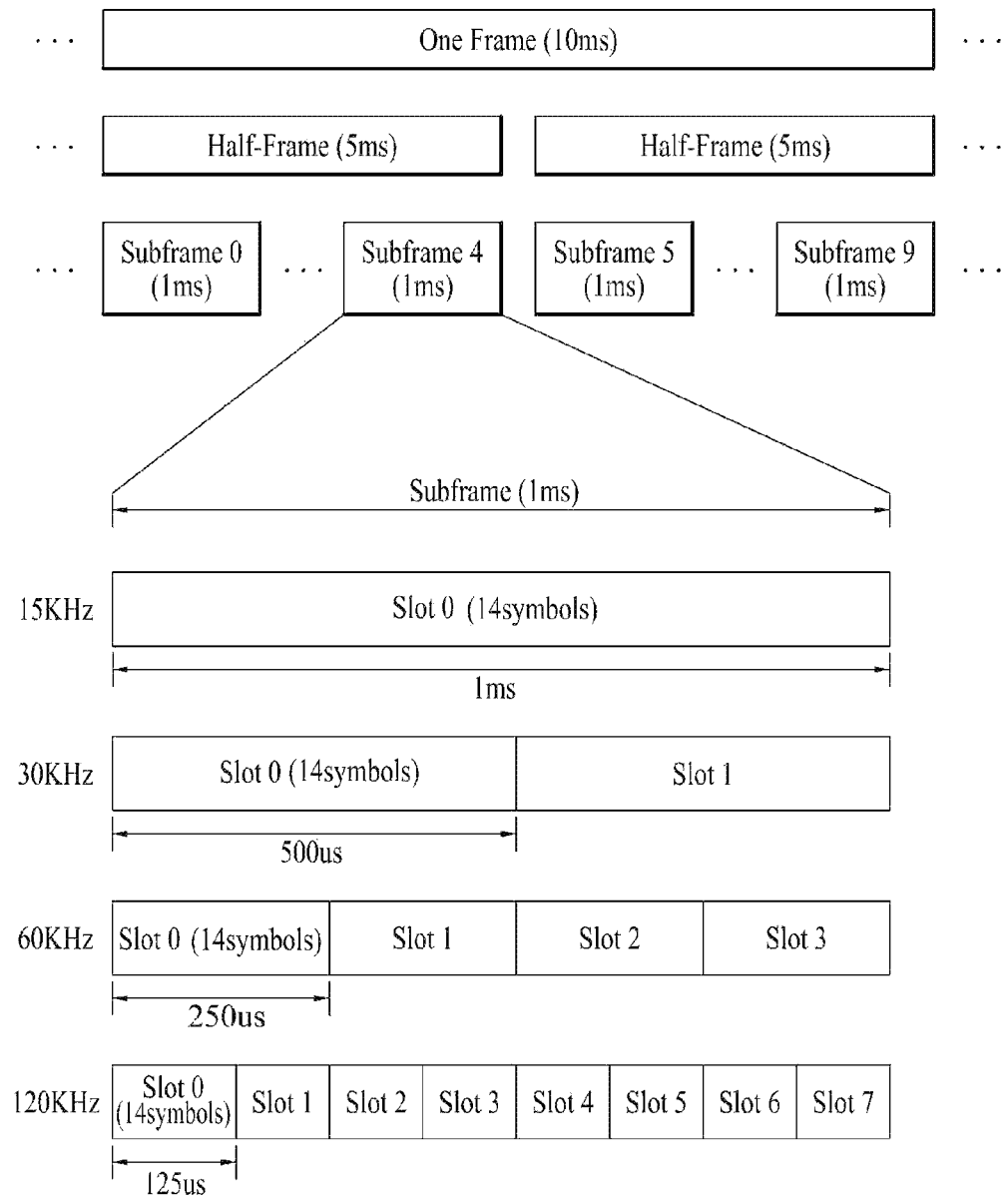

[Figure 5]
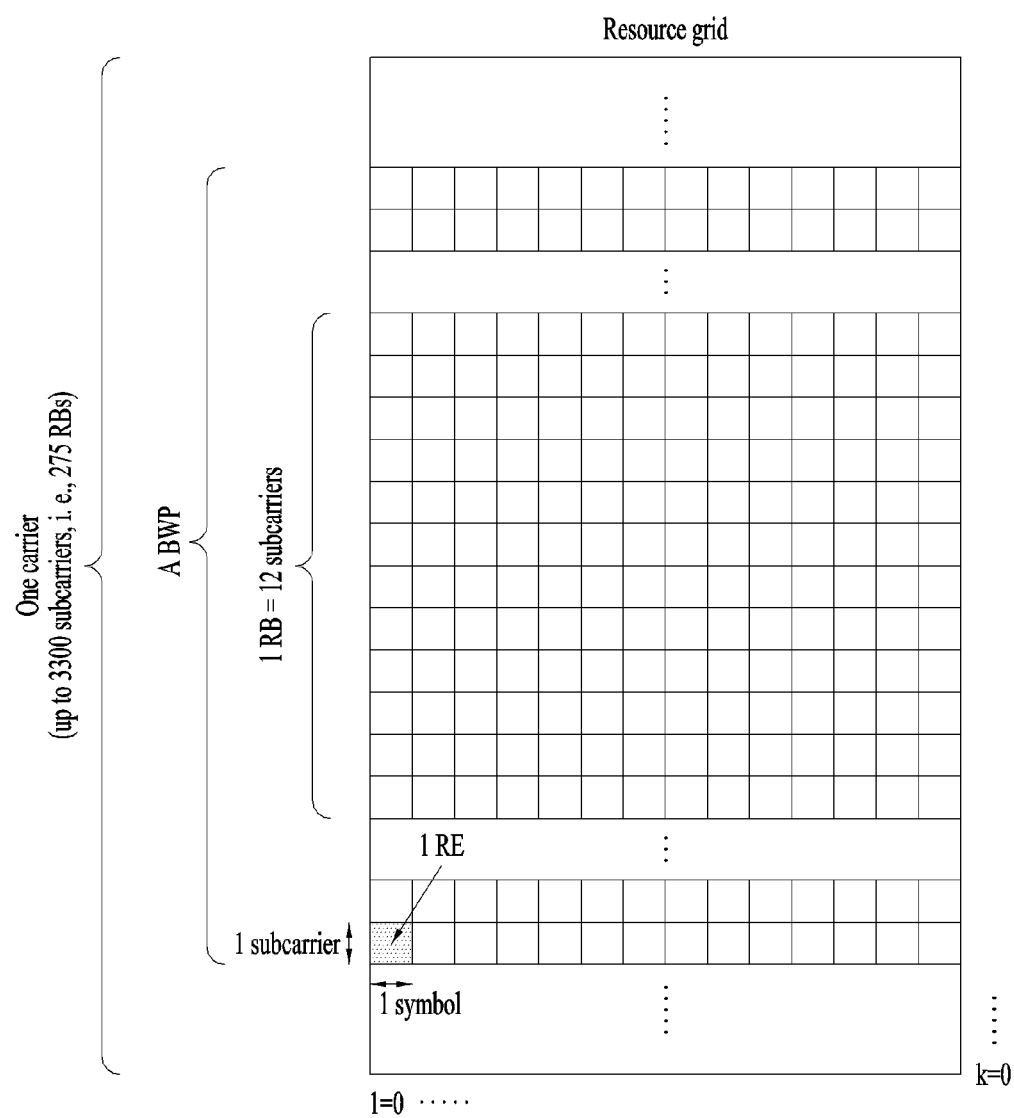

[Figure 6]
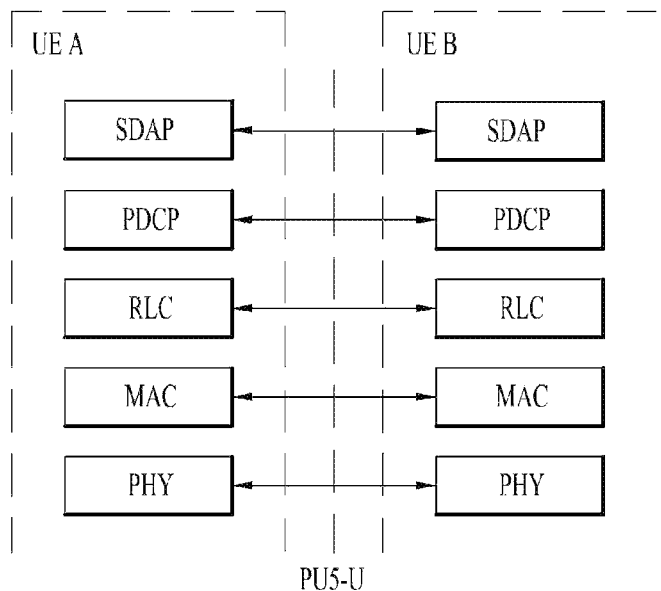
(a)
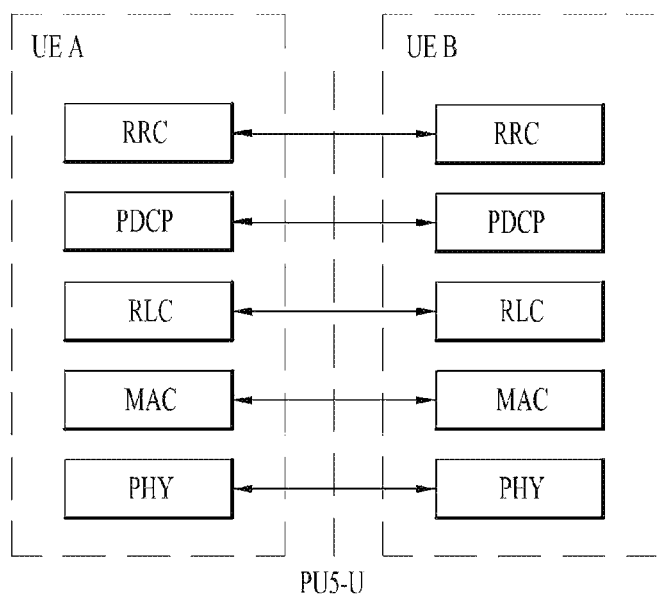
(b)

[Figure 7]
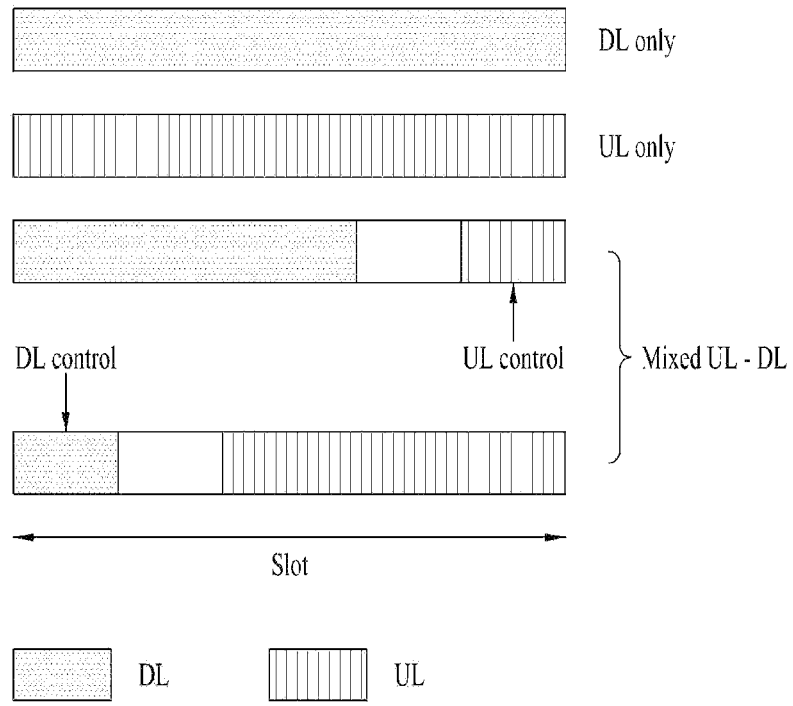
[Figure 8]
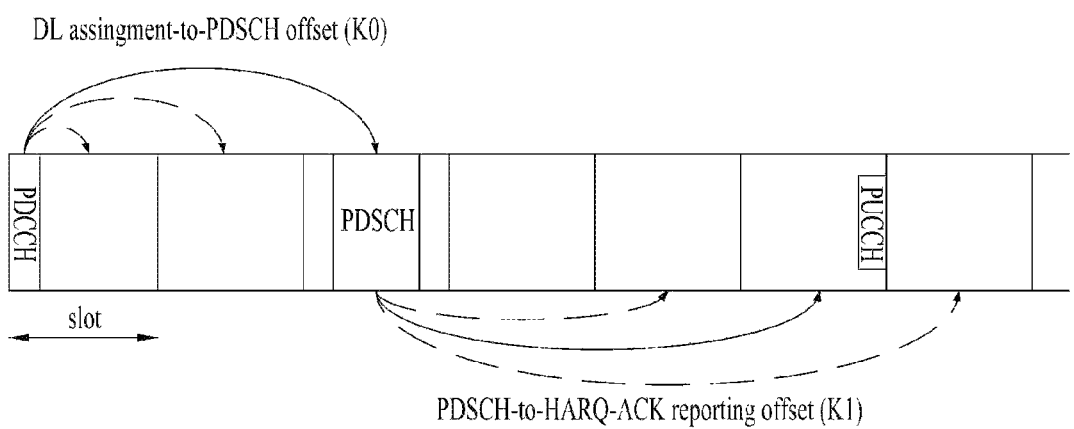

[Figure 9]
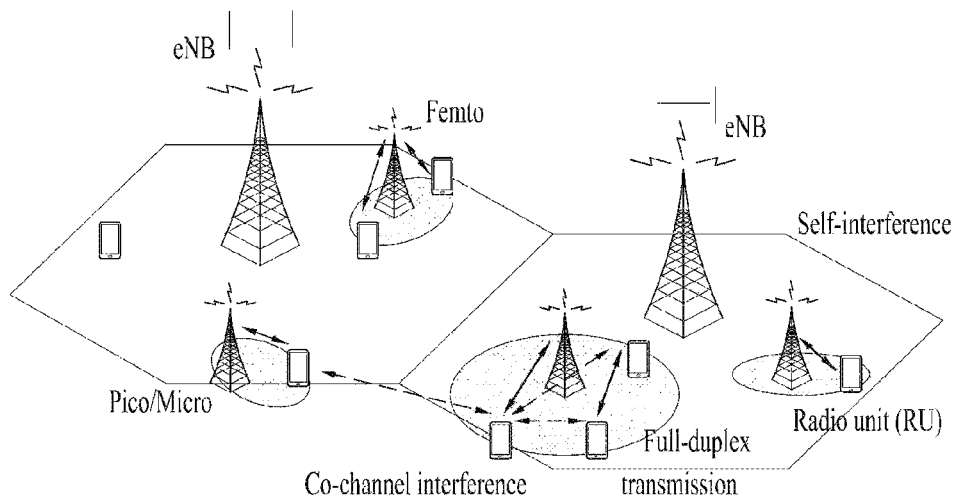
[Figure 10]
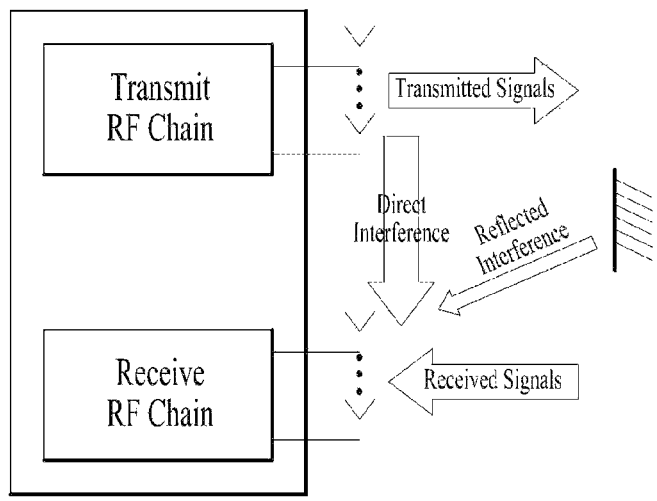

[Figure 11]
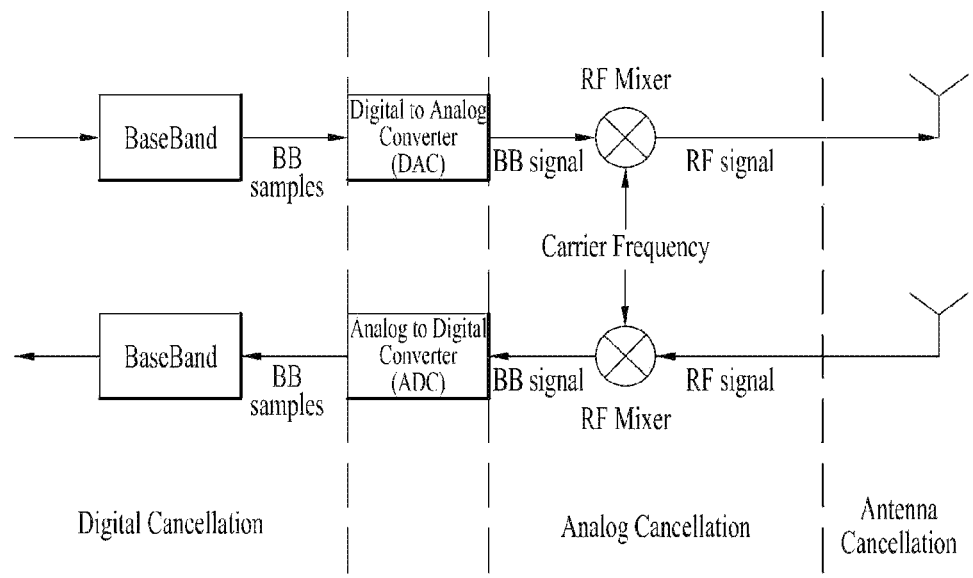

[Figure 12]
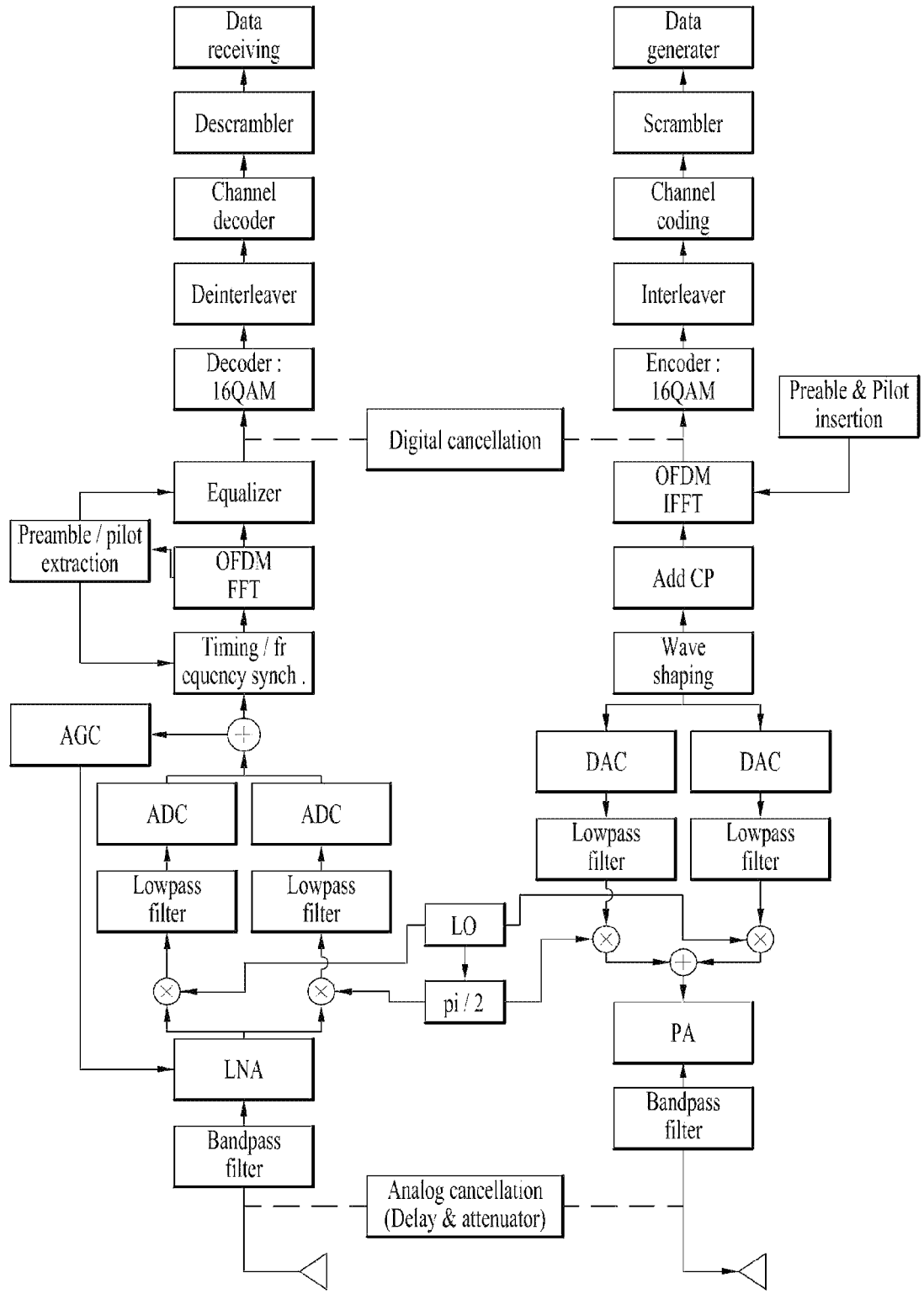

[Figure 13]
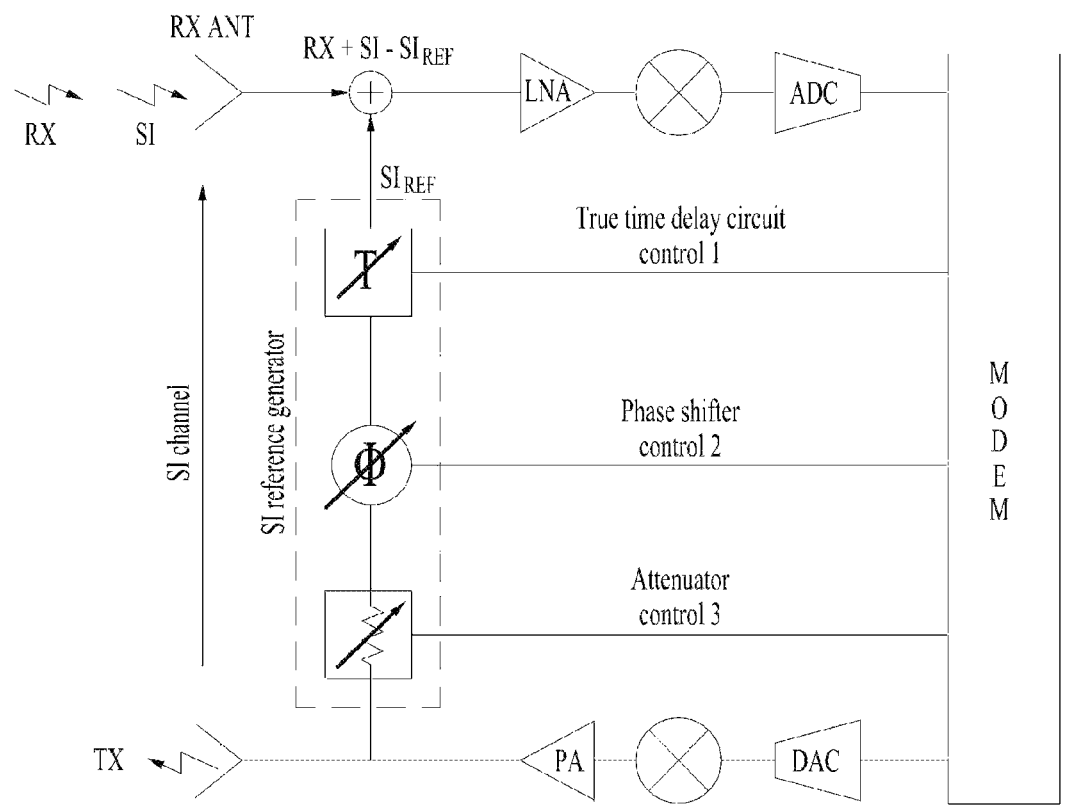

[Figure 14]
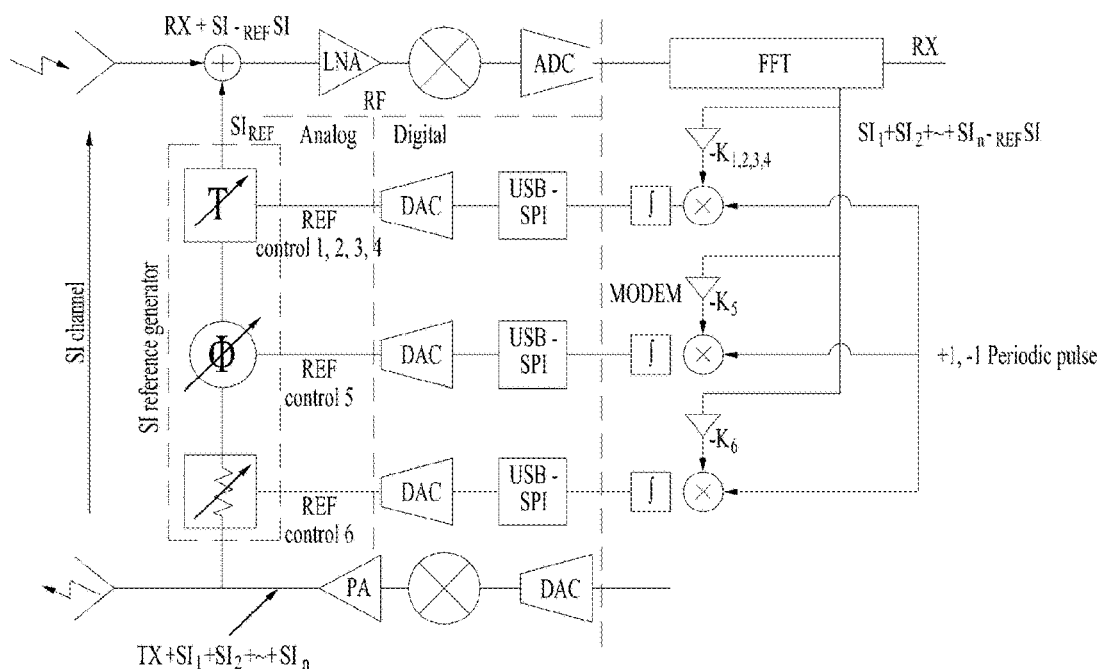

【Figure 15】
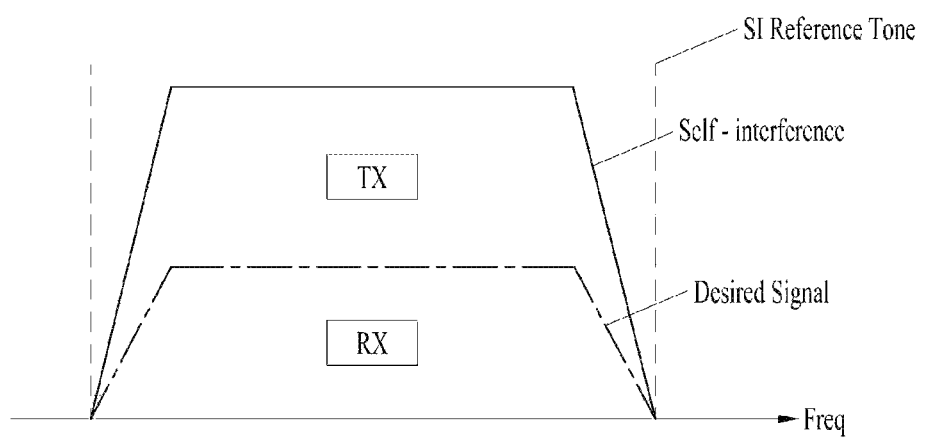

【Figure 16】
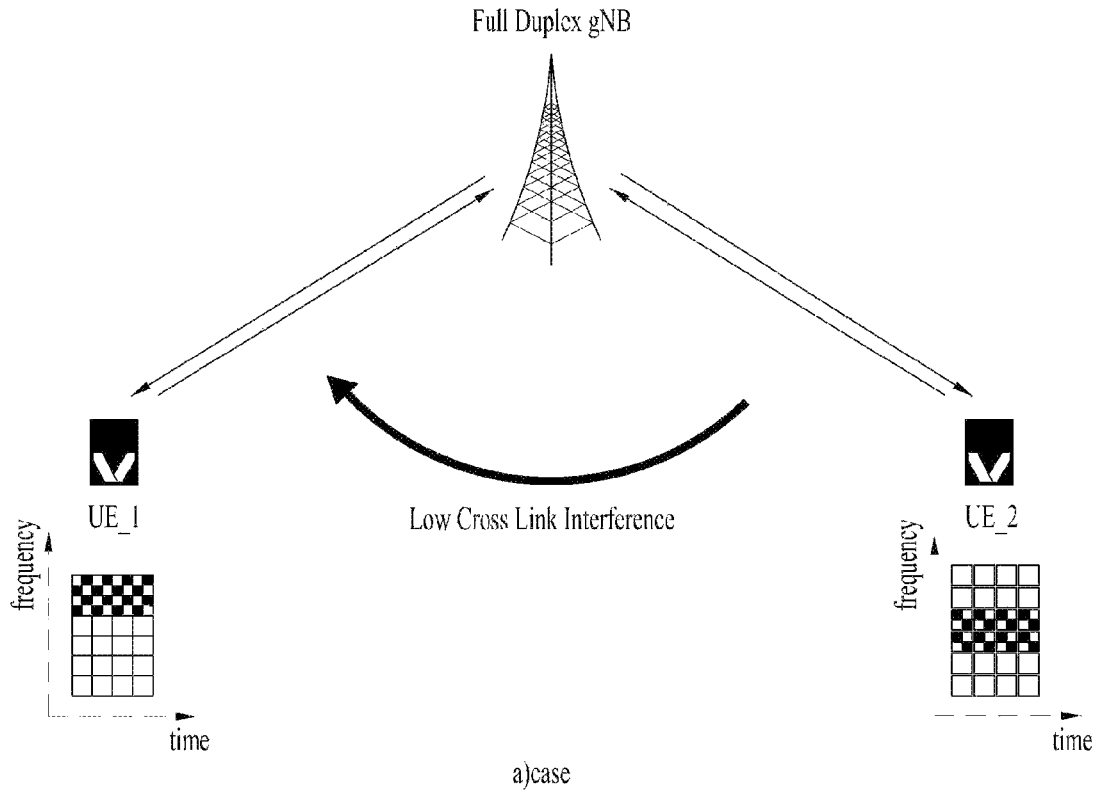
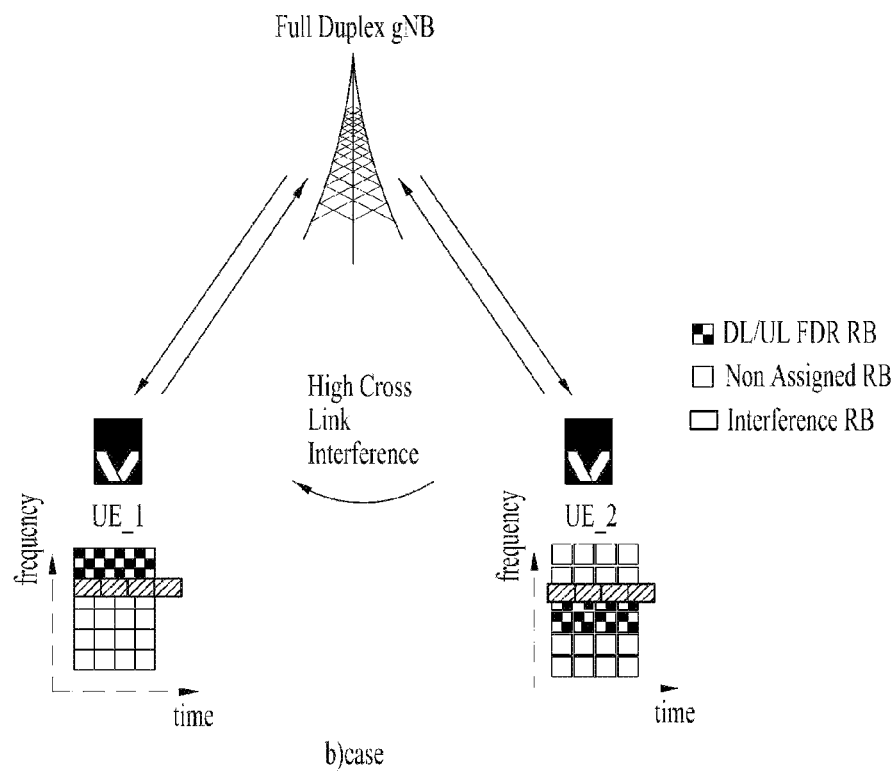

[Figure 17]
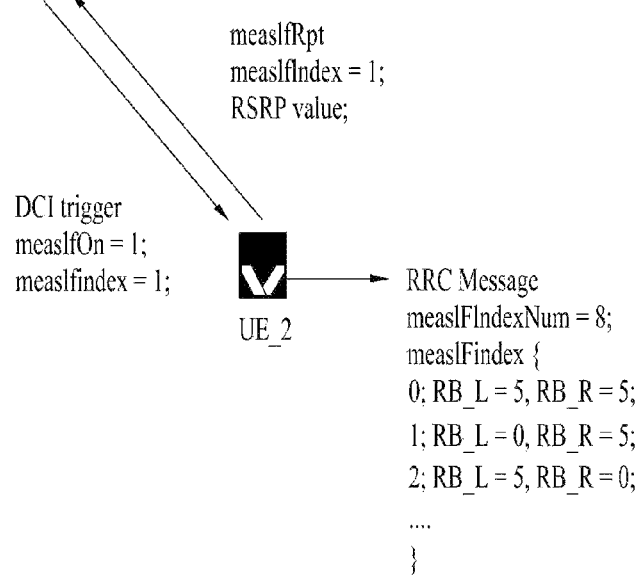

[Figure 18]
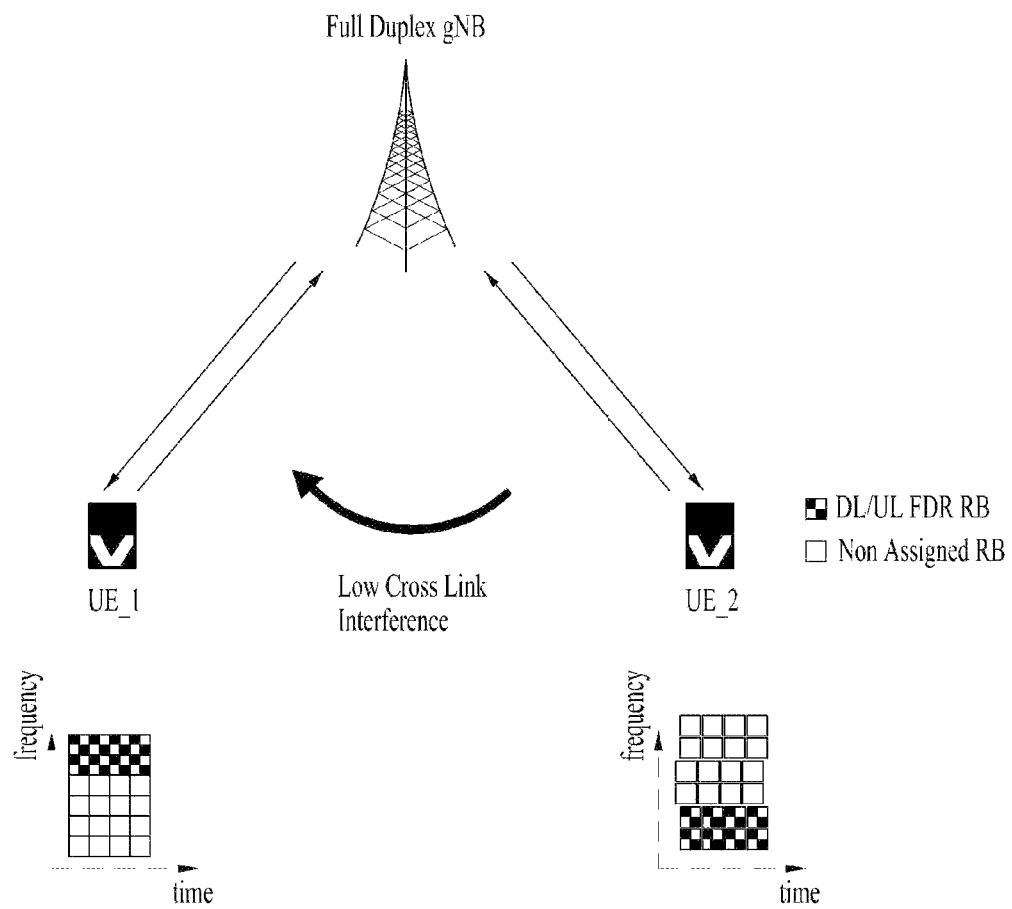

[Figure 19]
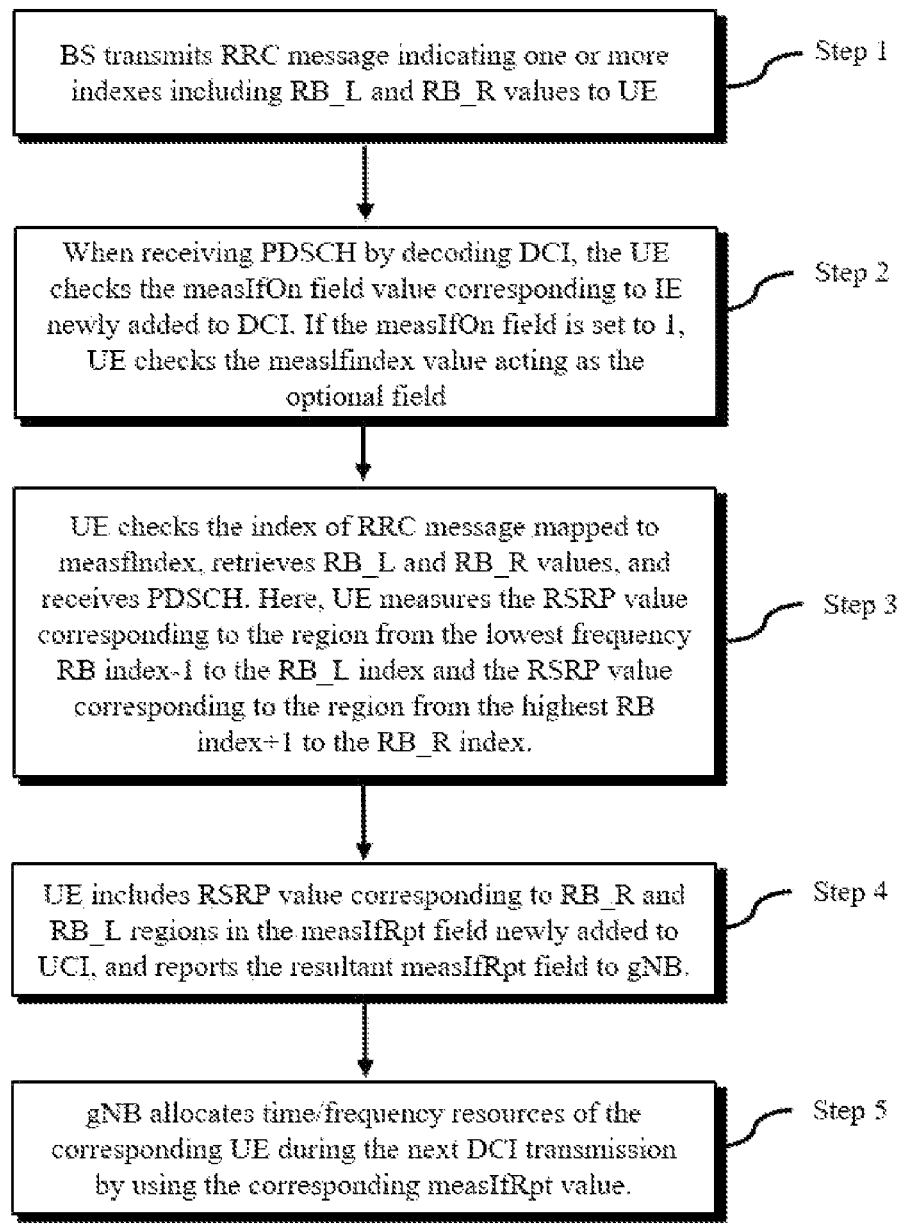

[Figure 20]
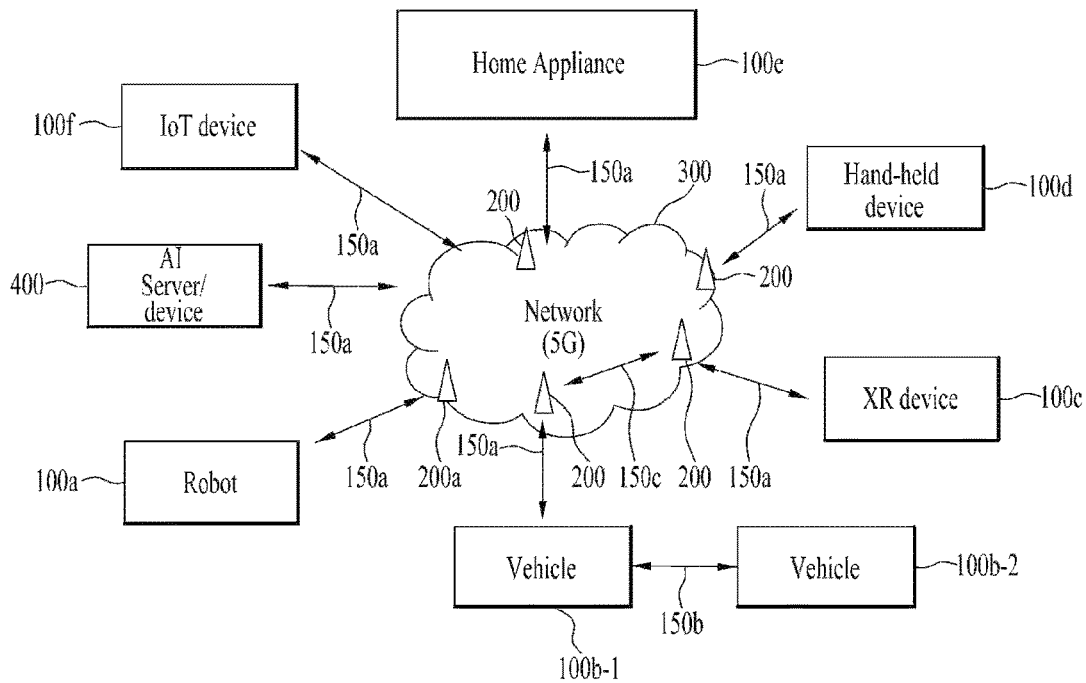
[Figure 21]
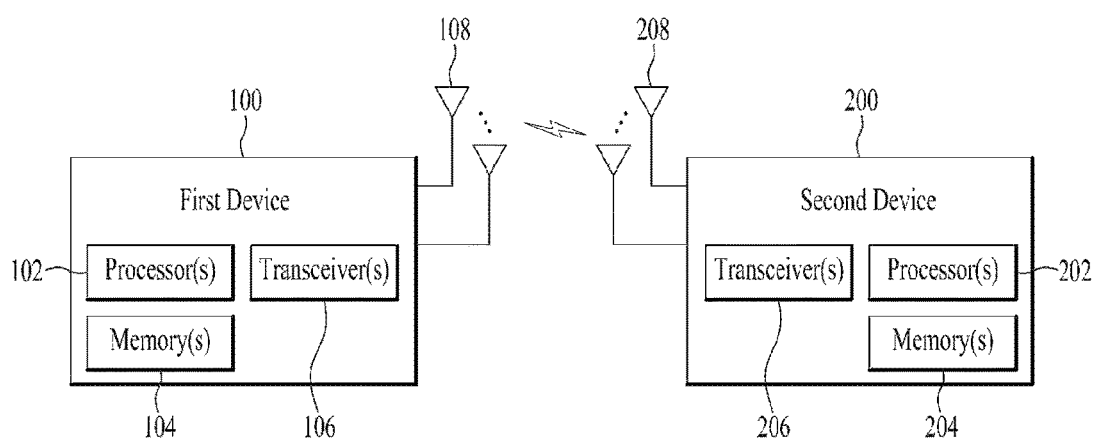

[Figure 22]
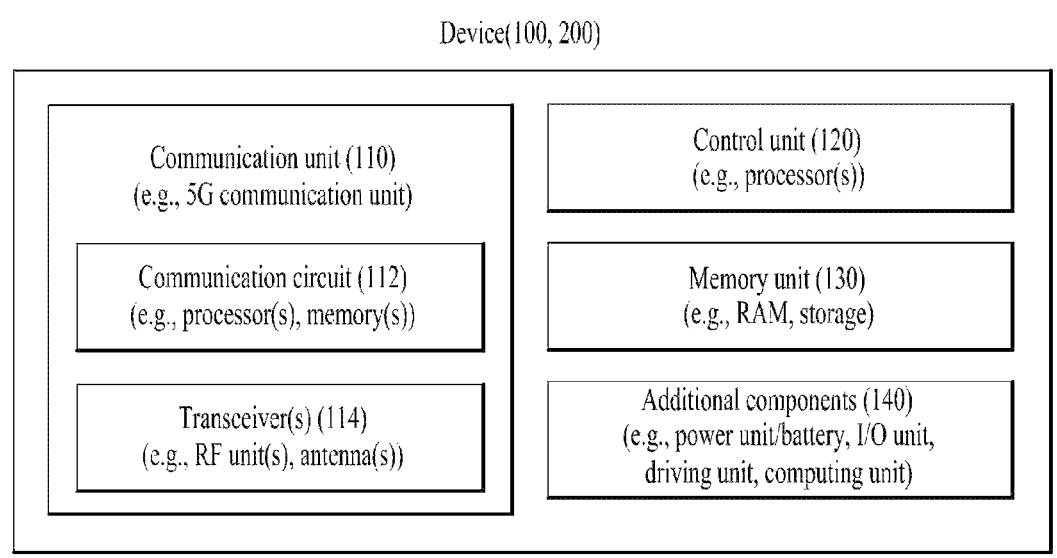
[Figure 23]
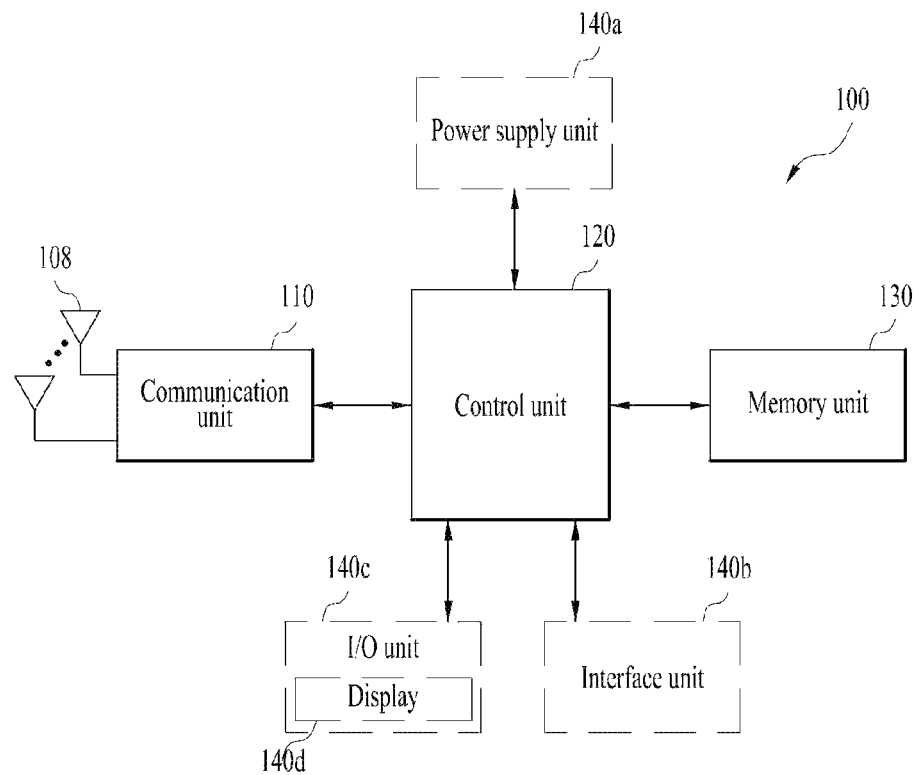

[Figure 24]
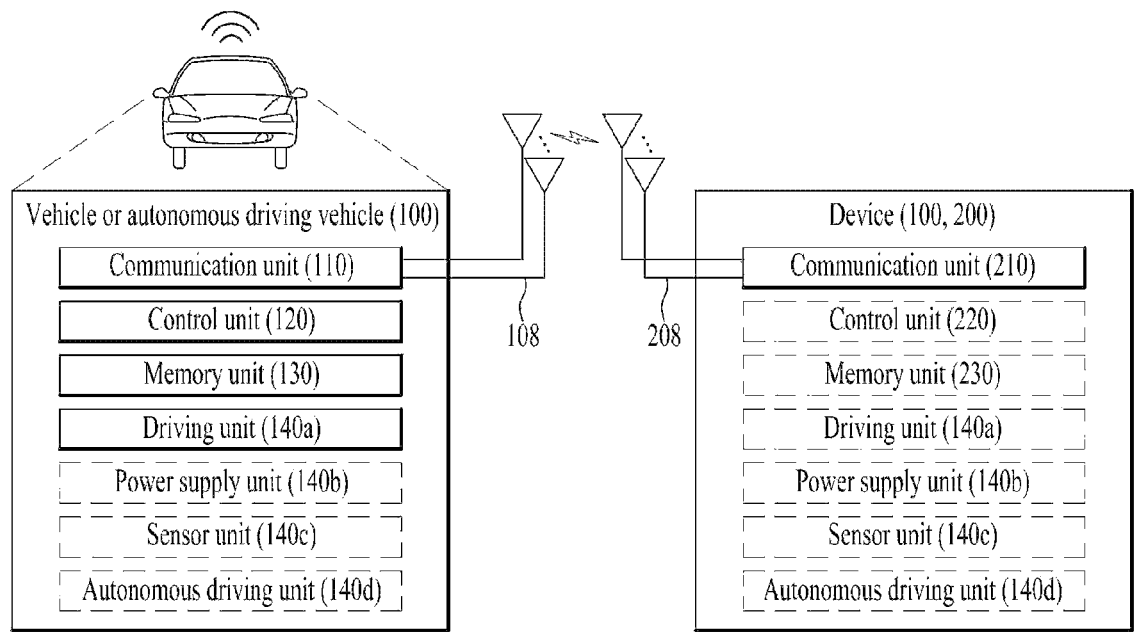

METHOD FOR TRANSMITTING/RECEIVING DATA IN WIRELESS COMMUNICATION SYSTEM SUPPORTING FULL DUPLEX COMMUNICATION, AND APPARATUS THEREFOR

This application is the National Stage filing under 35 U.S.C. 371 of International Application No. PCT/KR2020/007101 filed on Jun. 2, 2020, the contents of which is hereby incorporated by reference herein in its entirety.

TECHNICAL FIELD

The present disclosure relates to a method and apparatus for transmitting and receiving data related to full duplex radio (FDR) in a wireless communication system supporting full duplex radio (FDR).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

Also, the UE or vehicle may receive resource allocation for an uplink signal and a resource allocation for a downlink signal from the base station. The UE or vehicle may be allocated resources for the uplink signal from the base station through uplink control information (UCI), or may receive resources for the downlink signal from the base station through uplink control information (DCI).

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

SUMMARY

The problem to be solved is as follows. Since reception and transmission of data are simultaneously possible in a full duplex radio (FDR) communication system, interference between UEs exists according to allocation of time/frequency resources between the UEs, SINR of reception (Rx) or transmission (Tx) data is reduced so that efficiency of the entire FDR communication system is also reduced. In order to address this issue, the present disclosure provides the aforementioned channel measurement scheme in which downlink control information (DCI) structure and uplink control information (UCI) structure are redefined to increase the efficiency of the FDR communication system and a new RRC message is used.

It will be appreciated by persons skilled in the art that the objects that could be achieved with the present disclosure are not limited to what has been particularly described hereinabove and the above and other objects that the present disclosure could achieve will be more clearly understood from the following detailed description.

In accordance with an aspect of the present disclosure, a method for transmitting and receiving signals by a user equipment (UE) in a wireless communication system may include receiving frequency configuration information from a base station (BS); receiving a control channel including downlink control information (DCI) from the BS; receiving a downlink signal from the BS based on the DCI; and transmitting hybrid automatic repeat and request acknowledgement/negative-acknowledgement (HARQ-ACK/NACK) for the received downlink signal to the BS, wherein the frequency configuration information includes: information about a length L of a predetermined frequency resource from the lowest frequency at which the downlink signal is received, and information about a length R of a predetermined frequency resource from the highest frequency at which the downlink signal is received, wherein the DCI includes an index indicating the length L and the length R.

The DCI may include a field indicating whether the frequency configuration information is applied, and the information about the frequency is used based on a case in which a value of the field indicating whether the frequency configuration information is applied is set to '1'.

The method may further include: measuring first reception power of a downlink signal received from a frequency resource corresponding to the length L from among the received downlink signals; and measuring second reception power of a downlink signal received from a frequency resource corresponding to the length R from among the received downlink signals.

The transmitting the HARQ-ACK/NACK for the received downlink signal may include transmitting information about the measured first reception power and the measured second reception power.

The method may further include receiving scheduling information based on the measured first reception power and the measured second reception power.

The frequency configuration information may be received through a higher layer signal.

In accordance with another aspect of the present disclosure, a user equipment (UE) for transmitting and receiving signals in a wireless communication system may include a transceiver; and a processor, wherein the transceiver is configured to: receive frequency configuration information from a base station (BS); receive a control channel including downlink control information (DCI) from the BS; receive a downlink signal based on the DC) from the BS; and transmit hybrid automatic repeat and request acknowledgement/negative-acknowledgement (HARQ-ACK/NACK) for the received downlink signal to the BS, wherein the frequency configuration information includes: information about a length L of a predetermined frequency resource from the lowest frequency at which the downlink signal is received, and information about a length R of a predetermined frequency resource from the highest frequency at which the downlink signal is received, wherein the DCI includes an index indicating the length L and the length R.

In accordance with another aspect of the present disclosure, a method for transmitting and receiving signals by a base station (BS) in a wireless communication system may include: transmitting frequency configuration information to a user equipment (UE); transmitting a control channel including downlink control information (DCI) to the UE; transmitting a downlink signal to the UE based on the DCI; and receiving hybrid automatic repeat and request acknowledgement/negative-acknowledgement (HARQ-ACK/NACK) for the downlink signal from the UE, wherein the frequency configuration information includes: information about a length L of a predetermined frequency resource from the lowest frequency at which the downlink signal is transmitted, and information about a length R of a predetermined frequency resource from the highest frequency at which the downlink signal is transmitted, wherein the DCI includes an index indicating the length L and the length R.

In accordance with another aspect of the present disclosure, a base station (BS) for transmitting and receiving signals in a wireless communication system may include a transceiver; and a processor, wherein the transceiver is configured to: transmit frequency configuration information to a user equipment (UE), transmit a control channel including downlink control information (DCI) to the UE; transmit a downlink signal to the UE based on the DCI; and receive hybrid automatic repeat and request acknowledgement/negative-acknowledgement (HARQ-ACK/NACK) for the downlink signal from the UE, wherein the frequency configuration information includes: information about a length L of a predetermined frequency resource from the lowest frequency at which the downlink signal is transmitted, and information about a length R of a predetermined frequency resource from the highest frequency at which the downlink signal is transmitted, wherein the DCI includes an index indicating the length L and the length R.

In accordance with another aspect of the present disclosure, a device for a user equipment (UE) may include: at least one processor; and at least one memory operatively connected to the at least one processor, and configured to store instructions such that the at least one processor performs specific operations by executing the instructions, wherein the specific operations include: receiving frequency configuration information from a base station (BS); receiving a control channel including downlink control information (DCI) from the BS; receiving a downlink signal from the BS based on the DCI; and transmitting hybrid automatic repeat and request acknowledgement/negative-acknowledgement (HARQ-ACK/NACK) for the received downlink signal to the BS, wherein the frequency configuration information includes: information about a length L of a predetermined frequency resource from the lowest frequency at which the downlink signal is received, and information about a length R of a predetermined frequency resource from the highest frequency at which the downlink signal is received, wherein the DCI includes an index indicating the length L and the length R.

In accordance with another aspect of the present disclosure, a computer-readable storage medium may be configured to store at least one computer program including instructions such that at least one processor performs operations for a user equipment (UE) by executing the instructions, wherein the operations include: receiving frequency configuration information from a base station (BS); receiving a control channel including downlink control information (DCI) from the BS; receiving a downlink signal from the BS based on the DCI; and transmitting hybrid automatic repeat and request acknowledgement/negative-acknowledgement (HARQ-ACK/NACK) for the received downlink signal to the BS, wherein the frequency configuration information includes: information about a length L of a predetermined frequency resource from the lowest frequency at which the downlink signal is received, and information about a length R of a predetermined frequency resource from the highest frequency at which the downlink signal is received, wherein the DCI includes an index indicating the length L and the length R.

As is apparent from the above description, the present disclosure provides a new method for measuring interference between UEs in the FDR communication system, and allows the base station (BS) to more efficiently allocate time/frequency resources based on the result of channels measured by the respective UEs.

The effects that can be achieved through the embodiments of the present disclosure are not limited to what has been particularly described hereinabove and other effects which are not described herein can be derived by those skilled in the art from the following detailed description.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 1 illustrates physical channels and a general signal transmission method using the physical channels as an exemplary wireless communication system;

FIG. 2 illustrates the structure of an NR system to which embodiment(s) are applicable.

FIG. 3 illustrates functional split between an NG-RAN and a 5GC to which embodiment(s) are applicable.

FIG. 4 illustrates the structure of an NR radio frame to which embodiment(s) are applicable.

FIG. 5 illustrates the slot structure of an NR frame to which embodiment(s) are applicable.

FIG. 6 illustrates a radio protocol architecture for SL communication.

FIG. 7 illustrates a structure of a self-contained slot.

FIG. 8 illustrates an ACK/NACK transmission process.

FIG. 9 shows the conceptual diagram of a user equipment and base station supportive of FDR.

FIG. 10 is a conceptual diagram exemplarily showing Tx/Rx link and Self-Interference (SI) in FDR communication situation.

FIG. 11 is a diagram showing positions for applying there kinds of interference schemes in an RF Tx/Rx stage (or RF front end) of a device.

FIG. 12 is a block diagram diagrammatizing a device for Self-Interference Clearance (Self-IC) in a communication device proposed in a communication system environment using OFDM based on FIG. 11.

FIG. 13 is a diagram showing an RF chain of a communication device for performing general Full Duplex Radio (FDR) technology.

FIG. 14 is a diagram showing one example of an RF chain structure of a communication device for self-interference signal cancellation in using FDR FIG. 15 is a diagram exemplarily showing two tones transmitted on both communication band sides to control a self-interference reference signal generator.

FIG. 16 is a diagram illustrating a scenario of interference occurrence between UEs to which the present disclosure can be applied.

FIG. 17 is a diagram illustrating an example in which, when UE-to-UE interference occurs, the UE performs interference measurement for the received (Rx) signal based on a new RRC message and reports the corresponding measurement value.

FIG. 18 is a diagram illustrating an example in which the respective UEs to which the present disclosure can be applied are allocated re-adjusted time/frequency resources.

FIG. 19 is a diagram illustrating a method for measuring interference between UEs to which the present disclosure can be applied.

FIG. 20 illustrates a communication system applied to the present disclosure;

FIG. 21 illustrates wireless devices applicable to the present disclosure.

FIG. 22 illustrates another example of a wireless device to which the present disclosure is applied. The wireless device may be implemented in various forms according to use-examples/services.

FIG. 23 illustrates a hand-held device applied to the present disclosure;

FIG. 24 illustrates a vehicle or an autonomous driving vehicle applied to the present disclosure.

BEST MODE

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR can utilize all available spectrum resources, from low frequency bands below 1 GHz to intermediate frequency bands from 1 GHz to 10 GHz and high frequency (millimeter wave) bands above 24 GHz.

In order to clarify technical features of various embodiments of the present disclosure, various embodiments of the present disclosure are mainly described not only for the 3GPP LTE/LTE-A system but also for the 3GPP NR system, but can also be applied to the IEEE 802.16e/m system, etc.

In a wireless access system, a user equipment (UE) may receive information from a base station (BS) through downlink (DL) and may transmit information to the BS through uplink (UL). Transmission/reception (Tx/Rx) information between the UE and the BS may include general data information and various control information, and various physical channels may exist according to types/usages of the Tx/Rx information.

FIG. 1 illustrates physical channels and a general method for transmitting signals on the physical channels.

Referring to FIG. 1, when a UE is powered on or enters a new cell, the UE performs initial cell search (S11). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB.

Then, the UE may acquire information broadcast in the cell by receiving a physical broadcast channel (PBCH) from the eNB.

During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S12).

If the UE initially accesses the eNB or has no radio resources for signal transmission to the eNB, the UE may perform a random access procedure with the eNB (S13 to S16). In the random access procedure, the UE may transmit a predetermined sequence as a preamble on a physical random access channel (PRACH) (S13 and S15) and may receive a response message to the preamble on a PDCCH and a PDSCH associated with the PDCCH (S14 and S16). In the case of a contention-based RACH, the UE may additionally perform a contention resolution procedure.

On the other hand, when the random access process is performed in two steps, S13/S15 may be performed as one operation in which the UE performs data transmission, and S14/S16 may be performed as one operation in which the BS performs data transmission.

After the above procedure, the UE may receive a PDCCH and/or a PDSCH from the eNB (S17) and transmit a physical uplink shared channel (PUSCH) and/or a physical uplink control channel (PUCCH) to the eNB (S18), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

FIG. 2 illustrates the structure of a NR system to which the present disclosure is applicable.

Referring to FIG. 2, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

FIG. 3 illustrates functional split between the NG-RAN and the 5GC to which the present disclosure is applicable.

Referring to FIG. 3, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

FIG. 6 illustrates a radio protocol architecture for SL communication. Specifically, FIG. 6-(a) shows a user plane protocol stack of NR, and FIG. 8-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

FIG. 7 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
    DL region+Guard period (GP)+UL control region
    DL control region+GP+UL region
    DL region: (i) DL data region, (ii) DL control region+ DL data region
    UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

FIG. 8 illustrates an ACK/NACK transmission process.

Referring to FIG. 8, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Overview of FDR System and Interference Factors in FDR

The FDR transmission/reception (Tx/Rx) system capable of simultaneously transmitting and receiving UL and DL signals on the same frequency band may perform frequency division or time division so that spectral efficiency of the FDR Tx/Rx system can be two times higher than the existing system. As a result, the FDR Tx/Rx system is spotlighted as one of the core technologies of the next generation 5G mobile communication system.

FDR configured to use a single frequency transmission band can be defined as a transmission resource configuration method that simultaneously performs data transmission/reception through a single frequency transmission band from the point of view of any wireless device. As a special example of FDR, wireless communication between a general BS (or a repeater, a relay node, a remote radio head (RRH), etc.) and a wireless UE can be expressed as a transmission (Tx) resource configuration method in which DL transmission and UL reception of the BS and DL reception and UL transmission of the wireless UE are simultaneously performed through a single frequency transmission band. As another example, in a device-to-device (D2D) direct communication situation between wireless UEs, FDR can also be expressed as a transmission resource configuration method in which transmission and reception of the wireless UEs are simultaneously performed in the same frequency transmission band. In the following disclosure, a general method for performing wireless communication between the BS and the wireless UE and FDR-related proposed technologies will be described, but the scope or spirit of the present disclosure is not limited thereto. Furthermore, the present disclosure may include an example of wireless communication with a network wireless device capable of wirelessly communicating with the UE other than the BS, and may further include D2D direct communication as needed.

FIG. 9 shows the conceptual diagram of a user equipment and base station supportive of FDR.

In the FDR situation shown in FIG. 9, total three types of interferences exist as follows.

Intra-device self-interference: As transmission and reception are performed with the same time and frequency resources, a signal transmitted by a device itself is simultaneously received as well as a desired signal. In this case, as the signal transmitted by the device itself barely has attenuation and is received by a Rx antenna of its own, it is received with power much greater than that of the desired signal, which means that it works as interference.

UE to UE inter-link interference: A UL signal transmitted by a UE is received by an adjacently located UE, thereby working as interference.

BS to BS inter-link interference: A signal transmitted between base stations or heterogeneous base stations (Picocell, femtocell, relay node) in HetNet situation is received by an Rx antenna of another base station, thereby working as interference.

Intra-device self-interference (hereinafter referred to as self-interference (SI)) among these three types of interference may be interference that occurs only in the FDR system and greatly degrades performance of the FDR system. Accordingly, in order to efficiently operate and manage the FDR system, the SI is the most serious problem to be solved first.

FIG. 10 is a conceptual diagram exemplarily showing Tx/Rx link and Self-Interference (SI) in FDR communication situation.

As shown in FIG. 10, Self-Interference (SI) may be categorized into direct interference that a signal transmitted from a Tx antenna directly enters an Rx antenna of its own without path attenuation and reflected interference that the signal is reflected by the surrounding terrain. And, a size of the SI is extremely larger than that of a desired signal due to a physical distance difference. Due to the intensity of the extremely large interference, effective cancellation of self-interference is required for the drive of FDR system.

In order to effectively drive the FDR system, requirements of Self-Interference Cancellation (Self-IC) according to maximum transmission power of a device may be determined as Table 5 (Self-IC requirements (BW=20 MHz) up FDR application in a mobile communication system).

TABLE 5

| Node Type | Max. Tx Power ($P_A$) | Thermal Noise, (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 5, it can be observed that Self-IC performance of 119 dBm is necessary in order for a User Equipment (UE) to effectively drive an FDR system on a BandWidth (BW) of 20 MHz. A thermal noise value may change into $N_{0,BW}$=−174 dBm+10×$\log_{10}$ (BW) depending on a bandwidth of a mobile communication system, and Table 7 was found on the assumption of a bandwidth of 20 MHz. Regarding Table 7, Receiver Noise Figure (NF) considers a worst case by referring to 3GPP specification requirements. A receiver thermal noise level is determined as a sum of terminal noise and receiver NF on a specific BW.

Types of Self-Interference Cancellation (Self-IC) Schemes and Application Methods FIG. 10 is a diagram showing positions for applying there kinds of interference schemes in an RF Tx/Rx stage (or RF front stage) of a device. In FIG. 10, application positions of three kinds of Self-IC schemes are illustrated. Hereinafter, the three kinds of Self-IC schemes are schematically described.

Antenna Self-IC: a Self-IC scheme supposed to be executed most preferentially among all Self-IC schemes is an antenna Self-IC scheme. SI cancellation is performed in an antenna stage. Most simply, a portion of an SI signal can be cancelled in a manner of physically cutting off a transfer of the SI signal by installing an object capable of cutting off a signal between a Tx antenna and an Rx antenna, artificially adjusting an inter-antenna distance by utilizing multiple antennas, or giving phase inversion to a specific Tx signal. Moreover, a portion of an SI signal may be cancelled by utilizing multiple polarized antennas or a directional antenna.

Analog Self-IC: This is a scheme of cancelling an SI signal using an analog signal copied by a scheme of cancelling interference in an analog stage before a received signal passes through Analog-to-Digital Converter (ADC). This may be performed in an RF or IF region. A method of cancelling an SI signal is described in detail as follows. First of all, a copy signal of an actually received SI signal is generated in a manner of time-delaying a transmitted analog signal and then adjusting an amplitude and phase of the signal and then subtracted from a signal received through an RX antenna. Yet, since it is processed using the analog signal, additional distortion may occur due to implementation complexity and circuit characteristics, which is disadvantageous in that interference cancellation performance may be changed considerably.

Digital Self-IC: This is a scheme of cancelling interference after a received signal has passed through ADC and includes all interference cancellation schemes performed in a baseband region. Most simply, it can be implemented in a manner of making a copy signal of SI using a transmitted digital signal and then subtracting it from a received digital signal. Alternatively, schemes for preventing a transmitted signal of a UE or BS from being received through an Rx antenna in a manner of performing precoding/postcoding on a baseband using multiple antennas may be classified as Digital Self-IC. However, Digital Self-IC is possible if a digitally modulated signal is quantized enough to reconstruct information on a desired signal. Thus, in order to perform Digital Self-IC, it is necessary to premise condition that a signal power level difference between an interference signal, which remains after cancelling interference using at least one of the above schemes, and a desired signal should enter an ADC range.

FIG. 12 is a block diagram diagrammatizing a device for Self-Interference Cancellation (Self-IC) in a communication device proposed in a communication system environment using OFDM based on FIG. 11.

Regarding a location of a Digital Self-IC block, although FIG. 12 shows that it is performed directly using digital SI signal information before DAC and digital SI signal information after ADC, it may be performed using a digital SI signal after IFFT and a digital SI signal before FFT. In addition, although FIG. 12 is the conceptual diagram showing that a SI signal is cancelled by separating a Tx antenna and an Rx antenna from each other, antenna configuration may be different that of FIG. 12 in case of using an antenna interference cancellation scheme using a single antenna.

Signal Modeling of FDR System

Since the FDR system uses the same frequency between the transmission (Tx) signal and the reception (Rx) signal, non-linear components in RF may greatly affect the FDR system. Specifically, the Tx signals may be distorted by non-linear characteristics of active elements such as a power amplifier (PA) of the Tx RF chain and a low noise amplifier (LNA) of the Rx RF chain, and may also be distorted by a mixer for use in the Tx/Rx RF chains. Tx signals generated by such distortion can be modeled as signals caused by high-order components. Since even-order components affects a high frequency region corresponding to several times the peripheral and intermediate (center) frequencies of the DC, the even-order components can be effectively removed using the legacy AC coupling or filtering method. However, since odd-order components are generated adjacent to the legacy intermediate frequency, they cannot be easily removed unlike even-order components. As a result, the received odd-order components may greatly affect system performance. Considering the non-linear characteristics of the odd-order components, the reception (Rx) signal to be received after the ADC of the FDR system can be expressed by the following equation 1 according to the Parallel Hammerstein (PH) model.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \text{ [Equation 1]}$$

In Equation 1, $x_D(n)$ is data to be received, $h_D(n)$ is a data channel experienced by the data to be received, $x_{SI}(n)$ is data that was transmitted from the system, $h_{SI,k}(n)$ is self-channel experienced by the data that was transmitted from the system, wherein, if k is '1', this means linear components, if k is an odd value of 3 or more, this means non-linear components, and 'z(n)' is Additive White Gaussian Noise (AWGN).

FIG. 13 is a diagram showing an RF chain of a communication device for performing general Full Duplex Radio (FDR) technology.

In order to cancel an SI signal in a communication device using FDR, it is necessary to generate a copy signal (hereinafter, SI interference signal) exactly identical to the SI signal. Referring to FIG. 3, for the cancellation of an SI signal, a method of subtracting an SI reference signal SIREF from an SI signal (SI) before LNA of an Rx stage of an RX chain is used in general. In this case, in order to generate the SI reference signal SIREF in the communication device, a Tx signal of a Tx stage is diverged (e.g., a case of diversion after PA in the Tx stage is shown in FIG. 3) and a portion of the Tx signal is then set to pass through an SI reference generator including an attenuator, a phase shifter and a true time delay circuit. The SI reference generator generates an SI reference signal to imitate an SI channel using the diverged Tx signal. In doing so, in order for the SI reference generator to imitate the SI channel, a channel into which the SI signal is put is estimated separately.

The communication device may estimate the SI channel and then generate a control signal inputted to the true time delay circuit, a control signal inputted to the phase shifter, and a control signal inputted to the attenuator. In this case, an SI reference signal path and a desired Rx signal should be in a state of not coming in entirely.

As a method for a communication device to control an SI reference generator, there may be two kinds of methods.

According to a first method, in order to separately estimate an SI signal incoming channel, a communication device stops communication and transmits an SI channel estimation signal (e.g., pilot signal, reference signal, etc.) on an allocated communication band (or a channel band) and an SI reference generator may imitate an SI signal upon communication using information of the SI channel estimation signal.

According to a second method, a communication device may transmit an SI signal channel estimation signal (e.g., reference signal, pilot signal, tone, etc.) carried on both ends (e.g., guard band) of a communication channel band and control an SI reference generator in a direction that the corresponding SI signal channel estimation signal is reduced according to an adaptive feedback algorithm.

In the first method, to find an optimized state of the SI reference generator, it is necessary to estimate an SI channel. To this end, a Tx device (or a Tx side) and an Rx device (or an Rx side) should stop communication as well. Moreover, even though perfect SI channel estimation is performed, it is necessary to calibrate a channel of an SI reference path very precisely. The channel of the SI reference path needs to become a lookup table based on the combination of all control voltages. Although an accurate lookup table is written with specific Tx power and temperature, it is supposed to change depending on an original Tx power and a temperature of circuit. Hence, SI signal cancellation performance is inevitably degraded due to a difference between a current Tx power and temperature and a condition at the timing of preparing the lookup table. Moreover, there is a disadvantage that it is unable to follow an SI signal channel (or an SI channel) that changes depending on a time.

Regarding the second method, as a communication device can transmit an SI signal channel estimation signal (tone, pilot signal, reference signal, etc.) carried on both communication band sides without stopping communication and controls an SI reference generator time-continuously using adaptive feedback algorithm, calibration of the SI reference generator is unnecessary. However, as the SI reference generator is controlled using a tone of a guard band on both communication band sides instead of a communication band, it is disadvantageous in that an SI signal attributed to a transmission of a tone inside the communication band, which is most important, is not cancelled.

FIG. 14 is a diagram showing one example of an RF chain structure of a communication device for self-interference signal cancellation in using FDR.

Referring to FIG. 14, an RF chain of a communication device may include a communication modem (or a modem), an SI reference generator, a transmission (Tx) antenna, a reception (Rx) antenna, etc. The communication modem may include a Fast Fourier Transform (FFT) unit and integrators. The SI reference generator may include an attenuator, a phase shifter, and a true time delay circuit.

To generate (or copy) a fine SI reference signal, the SI reference generator may control the attenuator, the phase shifter and the true time delay circuit using an analog manner. To this end, the RF chain may include a Digital to Analog Converter (DAC) configured to convert a control signal transmitted from the communication modem (or modem) into an analog signal.

According to the concept of the true time delay circuit (true time delay) defined as a slope of phase shift to frequency band basically, as it is unable to control a true time delay with information on a single frequency only, it is necessary to obtain information on at least two frequencies in order to perform SI signal cancellation on a wide band. Therefore, it is assumed to transmit two or more pilot signals, two or more reference signals, two or more tones, or the like, which are test signals.

In order to control the SI reference generator, how to use multiple reference signals (or, multiple tones, multiple pilot signals, etc.), which are test signals, is described. First of all, the communication model (or modem) shown in FIG. 15 may monitor a sum of powers of multiple tones at the frequencies where the multiple tones are located as test signals, measure the powers at the frequency positions where the multiple tones are transmitted, respectively, and then calculate the sum of the measured powers. Here, the power measured at the frequency position of the transmitted tone corresponds to the power of the SI signal.

The communication modem may transmit a control signal to minimize a difference between the power sum of SI signals attributed to multiple tones and the power of an SI reference signal. Namely, the communication modem may feed a control signal, which is to minimize the sum of the powers of the SI signals attributed to the multiple tones, back to the SI reference generator. The SI reference generator generates an SI reference signal according to the feedback control signal. To cancel the measured power sum of the SI signals, the communication modem may generate an SI reference signal having a power of a value closest to the power sum.

The communication modem may control the SI reference generator until the power sum (SI=SI1+SI2+SI3+ . . . +SIn) is minimized using the adaptive feedback loop. Here, Sin is a power of an SI signal measured at a frequency position where an nth reference signal among a plurality of reference signals is transmitted. The communication modem uses a periodic pulse signal of +1 and −1 to change a sign of an increment of a bias voltage controlled by a loop function of adaptive feedback. The loop function means a function for searching surroundings of a current variable in a feedback loop including a variable to control.

The communication modem may feed a control signal back to each of the phase shifter, the attenuator and the true time delay circuit using an adaptive feedback loop so as to enable the SI reference generator to generate an SI reference signal having a power closest to a power sum of SI signals.

As a method of controlling SI reference signal generation according to FIG. 14 operates adaptive feedback algorithm with the power sum of multiple tones, it is advantageous in that complicated channel estimation, calibration and the like are unnecessary. Nmnm FIG. 15 is a diagram exemplarily showing two tones transmitted on both communication band sides (e.g., guard bands) to control a self-interference (SI) reference signal generator.

Referring to FIG. 15, an SI reference generator may be controlled in such a way that a (guard band) SI signal channel estimation tone is included at both ends of a communication channel band and the corresponding estimation tone is reduced according to an adaptive feedback algorithm. In this case, a desired signal from which self-interference (SI) was removed can be stably received by the system.

Although a wireless user equipment (UE) for use in the legacy communication system transmits or receives data using a time-division multiplexing (TDM) scheme or a frequency-division multiplexing (FDM) scheme, the wireless UE for use in the full duplex radio (FDR) communication system can simultaneously perform transmission and reception of data as the base station (BS) simultaneously transmits and receives data without restriction of TDM and FDM. Accordingly, while any UE simultaneously performs transmission and reception of data, other UEs may also perform transmission or reception of data, and frequency/time resources allocated to the respective UEs may act as interference to transmission/reception of each UE. Therefore, in a full duplex radio (FDR) communication system, rather than using a channel measurement method using the existing CSI-RS, etc., throughput and network efficiency of the entire FDR communication system can be improved using the effective channel measurement scheme at a time point where transmission and reception of PDSCH or PUSCH for actual data transmission/reception are performed.

Meanwhile, reception and transmission of data can be simultaneously performed in the FDR communication system, so that interference between the UEs exists according to allocation of time/frequency resources of the respective UEs. As a result, SINR of reception (Rx) data or transmission (Tx) data is deteriorated, resulting in reduction in efficiency of the entire FDR communication system.

In order to address this issue, the present disclosure proposes the above-described channel measurement scheme using a new RRC message by redefining downlink control information (DCI) and uplink control information (UCI) structures, so that the present disclosure can maintain compatibility with the legacy communication system and can increase the efficiency of the FDR communication system.

Hereinafter, the present disclosure proposes a method for measuring interference between the UEs in the FDR communication system so that the base station (BS) can efficiently allocate time/frequency resources through the channel measurement results of the respective UEs.

Accordingly, the present disclosure proposes a new measurement method in which the BS adds a new information element (IE) to DCI for PDSCH reception, adds an IE field reporting the proposed channel measurement result to UCI, and determines a target to be measured through a new RRC message.

1) In the FDR communication system, the base station (BS) may transmit a new RRC message to which two new IE fields (RB_L and RB_R) are added to each UE (UEi). Here, RB_L is an integer value indicating the length of an arbitrary RB starting from the lowest frequency RB upon receiving a PDSCH, and RB_R is an integer value indicating the length of an arbitrary RB starting from the highest frequency RB upon receiving a PDSCH. A new RRC message may be divided into one RB_L and one RB_R, so that one or more indexes indicating the RRC message can be transmitted to a destination.

2) When the base station (BS) transmits DCI to allocate a PDSCH to an arbitrary UE, the new IE fields (i.e., measIfOn field and measIfIndex field) may be added to DCI and the resultant DCI is then transmitted. In this case, the measIfOn field is a mandatory field, and the measIfIndex field may be an optional field. If the measIfOn field is set to zero '0', the system may operate in the same manner as in the legacy communication system. If the measIfOn field is set to '1', the corresponding UE may operate as in the following paragraph 3).

3) After the UE receives DCI in which the measIfOn field is set to '1', the UE may check the index value of the measIfIndex field when receiving the PDSCH. The index value of the measIfIndex field may refer to the index value of RB_L/RB_R received as a new RRC message, resulting in RB_L and RB_R values of the corresponding indexes.

4) When the UE receives the PDSCH, the UE may measure a reference signal received power (RSRP) of the corresponding region simultaneously while receiving the PDSCH as much as RB_L from the lowest frequency region of the PDSCH. In addition, the UE may receive the PDSCH as much as RB_R from the highest frequency region of the PDSCH, thereby measuring the RSRP of the corresponding region.

5) When sending ACK/NACK information after receiving PDSCH, the UE may define each of the RSRP values corresponding to RB_L and RB_R regions as 'measIfRpt' using a PUCCH or a PUSCH, and may report the defined values to gNB.

6) gNB can recognize which one of the frequency/time domains causes interference to an arbitrary UE based on the measIfRpt values corresponding to RB_R and RB_L. As a result, time/frequency resources can be efficiently scheduled in the FDR communication system.

FIG. 16 is a diagram illustrating a scenario of interference occurrence between UEs to which the present disclosure can be applied.

A method to which the present disclosure can be applied can be described in more detail with reference to FIG. 16. As shown in FIG. 16, assuming that both UE_1 and UE_2 are FDR UEs, there is no problem in Case (A) in which UE_1 and UE_2 are located far from each other, but there occurs a problem in Case (B) in which transmission/reception of UE_1 causes interference to UE_2 and transmission/reception of UE_2 causes interference to UE_1 so that UE_1 performance and UE_2 performance may be affected by such interferences. As shown in FIG. 16, in Case (B), the lower frequency portion of the DL/UL RB allocated to UE_1 and the upper frequency portion of the DL/UL RB allocated to UE_2 are subjected to interference due to Cross-Link Interference (CLI).

FIG. 17 is a diagram illustrating an example in which, when UE-to-UE interference occurs, the UE performs interference measurement for the received (Rx) signal based on a new RRC message and reports the corresponding measurement value.

In Case (B) shown in FIG. 16, when UE_2 reports the RSRP values of DCI-triggered RB_L and RB_R as shown in FIG. 17, the gNB may recognize that UE_1 and UE_2 are located close to each other and interfere with each other.

In FIG. 17, UE_2 may simultaneously perform transmission/reception in the time/frequency resource domains to which PDSCH and PUSCH are simultaneously allocated, and at the same time may measure interference received through a new RRC message. In association with the index value to which the corresponding measIfIndex field is set to '1', as specified by the new RRC message, data transmission/reception may be performed in the range from the highest PDSCH/PUSCH frequency domain to the 5RB-higher frequency domain, and RSRP measurement may be performed, so that the corresponding RSRP value is reported to gNB through UCI.

For example, it is assumed that UE_1 receives a PDSCH corresponding to 40~60 RB indexes at the arbitrary slot (t) and at the same time transmits a PUSCH corresponding to the same 40~60 RB indexes, and it is also assumed that UE_2 receives a PDSCH corresponding to 20~40 RB indexes and at the same time transmits a PUSCH corresponding to the same 20~40 RB indexes. In this case, assuming that the BS allows a specific value corresponding to 'measIfOn=1' and 'measIfIndex=1' to serve as DCI and allocates this DCI to UE_2, RB_L=0 and RB_R=5 indicating that the measIFindex field corresponding to a new RRC UE_2 pre-allocated to UE_2 is set to 1 are assumed.

In this case, while UE_2 receives a PDSCH corresponding to 20~40 RB indexes and at the same time transmits a PUSCH corresponding to 20~40 RB indexes, RB_R is set to 5 (RB_R=5) so that RSRP of RBs corresponding to 41~45 indexes can be measured. In the range of 41~45 RB indexes, power of PDSCH data of UE_1 and leakage power generated during transmission of PUSCH corresponding to 20~40 RBs of UE_2 will be present. However, when UE_1 is located close to UE_2, power generated when UE_1 transmits a PUSCH corresponding to 40~60 RBs will be measured more dominantly than power generated when UE_1 is located far from UE_2. That is, when UE_2 measures power of 41~45 RBs in a situation where UE_1 and UE_2 are located close to each other as compared to the other case in which UE_1 and UE_2 are spaced apart from each other, the UE_2 can measure much more power. When the UE_2 informs the BS of the measurement result, the BS can recognize that adjacent PDSCH/PUSCH RBs are allocated to UE_1 and UE_2 and two UEs (UE_1 and UE_2) are located close to each other.

Accordingly, the gNB may finally re-adjust time/frequency resources of UE_2 so as not to affect each UE, so that the gNB can perform transmission/reception by allocating time/frequency resources to prevent interference from occurring in each UE.

FIG. 18 is a diagram illustrating an example in which the respective UEs to which the present disclosure can be applied are allocated re-adjusted time/frequency resources. In FIG. 18, 0~20 RBs are allocated to UE_2.

FIG. 19 is a diagram illustrating a method for measuring interference between UEs to which the present disclosure can be applied.

That is, the UE-to-UE interference measurement method to which the present disclosure can be applied is as follows.

Step 1: The base station (BS) may transmit at least one index including the RB_L and RB_R values to the UE, and may transmit the at least one index serving as the RRC message to the UE.

Step 2: When the UE receives a PDSCH by decoding DCI, the UE may check the value of the measIfOn field corresponding to the IE newly added to DCI. When the measIfOn field is set to '1', the UE may check the value of the measIfIndex field acting as the optional field.

Step 3: UE may check the index of the RRC message mapped to the measIfIndex field, may retrieve RB_L and RB_R values, and may receive a PDSCH. In this case, the UE may measure the RSRP value corresponding to the region from the lowest frequency RB index−1 to the RB_L index and the RSRP value corresponding to the region from the highest RB index+1 to the RB_R index.

Step 4: UE may include the RSRP value corresponding to the RB_R and RB_L regions in the measIfRpt field newly added to UCI, and may report the resultant measIfRpt field to the gNB.

Step 5: gNB may allocate time/frequency resources of the corresponding UE during the next DCI transmission by using the corresponding measIfRpt value.

That is, what the present document intends to disclose is as follows.

1) A method for processing a new DCI field and the RRC message by the UE in the FDR communication system is as follows. In the FDR communication system, the UE may receive a PDSCH signal, and may process the new DCI field and the RRC message for performing signal measurement (e.g., RSRP) of a resource region adjacent to the RB allocated to the UE.

2) A method for reporting the measurement signal (e.g., RSRP) of the resource region to the BS using a new UCI field by each UE in the FDR communication system is as follows. In the FDR communication system, each UE may report, to the BS, the measurement signal (e.g., RSRP) of the resource region adjacent to the RB allocated to each UE using the new UCI field.

The present disclosure proposes new DCI and UCI structures and a channel measurement scheme using the new RRC message, thereby increasing system efficiency of the FDR communication system.

Hereinafter, devices for performing the above-described proposed methods will be described in detail.

Communication System Example to which the Present Disclosure is Applied

Although not limited thereto, various descriptions, functions, procedures, proposals, methods, and/or operational flow charts of the present disclosure disclosed in this document can be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (JAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

FIG. 21 illustrates a wireless device applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the chipset may include the processor(s) 102 and memory(s) 104. The memory(s) 104 may include at least one program capable of performing operations related to the embodiments above described. The processor(s) 102 may receive allocation of resources related to FDR based on the at least one program stored in the memory(s) 104.

The processor(s) 102 may control the RF transceiver(s) to report SIC capability to a BS. The processor(s) 102 may control the RF transceiver(s) to receive resource allocation information on a predetermined time period divided into a first time resource period and a second time resource period from the BS. In this case, the first time resource period may be a time resource period allocated to simultaneously perform transmission of a UL signal and reception of a DL signal in the same frequency band, and the second time resource period may be a time resource period allocated to perform either the transmission of the UL signal or the reception of the DL signal. In addition, the first time resource period and the second time resource period may be determined based on the SIC capability, the amount of first data related to the UL signal, and the amount of second data related to the DL signal.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor(s) 202 of a BS may control the RF transceiver(s) to receive a report on SIC capability related to FDR from a UE. The processor(s) 202 may determine a first time resource period in which transmission of a UL signal and reception of a DL signal are simultaneously performed in the same frequency band for a predetermined time period and a second time resource period in which either the transmission of the UL signal or the reception of the DL signal is performed. The processor(s) 202 may control the RF transceiver(s) to transmit resource allocation information including information on the first time resource period and the second time resource period to the UE.

In another aspect of the present disclosure, there is provided a computer-readable storage medium having at least one computer program configured to cause at least one processor to perform operations. The operations may include: providing information on SIC capability to a BS; and receiving resource allocation information on a predetermined time period divided into a first time resource period and a second time resource period from the BS. In this case, the first time resource period may be a time resource period allocated to simultaneously perform transmission of a UL signal and reception of a DL signal in the same frequency band, and the second time resource period is a time resource period allocated to perform either the transmission of the UL signal or the reception of the DL signal. In addition, the first time resource period and the second time resource period may be determined based on the SIC capability, the amount of first data related to the UL signal, and the amount of second data related to the DL signal.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

FIG. 22 illustrates another example of a wireless device applied to the present disclosure. The wireless device may be implemented in various forms according to a use-case/service (refer to FIG. 20)

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Examples of Mobile Devices to which the Present Disclosure is Applied

FIG. 23 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Examples of Vehicles or Autonomous Vehicles to which the Present Disclosure is Applied FIG. 24 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 24, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method for transmitting and receiving signals by a user equipment (UE) in a wireless communication system comprising:
receiving frequency configuration information from a base station (BS);
receiving a control channel including downlink control information (DCI) from the BS;
receiving a downlink signal from the BS based on the DCI; and
transmitting hybrid automatic repeat and request acknowledgement/negative-acknowledgement (HARQ-ACK/NACK) for the received downlink signal to the BS,
wherein the frequency configuration information includes:
information about a length L of a predetermined frequency resource from the lowest frequency at which the downlink signal is received, and
information about a length R of a predetermined frequency resource from the highest frequency at which the downlink signal is received,
wherein the DCI includes an index indicating the length L and the length R.

2. The method according to claim 1, wherein:
the DCI includes a field indicating whether the frequency configuration information is applied; and
the information about the frequency is used based on a case in which a value of the field indicating whether the frequency configuration information is applied is set to '1'.

3. The method according to claim 1, further comprising:
measuring first reception power of a downlink signal received from a frequency resource corresponding to the length L from among the received downlink signals; and
measuring second reception power of a downlink signal received from a frequency resource corresponding to the length R from among the received downlink signals.

4. The method according to claim 3, wherein the transmitting the HARQ-ACK/NACK for the received downlink signal includes:
transmitting information about the measured first reception power and the measured second reception power.

5. The method according to claim 4, further comprising:
receiving scheduling information based on the measured first reception power and the measured second reception power.

6. The method according to claim 1, wherein:
the frequency configuration information is received through a higher layer signal.

7. A user equipment (UE) for transmitting and receiving signals in a wireless communication system comprising:
a transceiver; and
a processor,
wherein
the transceiver is configured to:
receive frequency configuration information from a base station (BS);
receive a control channel including downlink control information (DCI) from the BS;
receive a downlink signal based on the DCI from the BS; and
transmit hybrid automatic repeat and request acknowledgement/negative-acknowledgement (HARQ-ACK/NACK) for the received downlink signal to the BS,
wherein the frequency configuration information includes:
information about a length L of a predetermined frequency resource from the lowest frequency at which the downlink signal is received, and
information about a length R of a predetermined frequency resource from the highest frequency at which the downlink signal is received,
wherein the DCI includes an index indicating the length L and the length R.

8. The UE according to claim 7, wherein:
the DCI includes a field indicating whether the frequency configuration information is applied; and
the information about the frequency is used based on a case in which a value of the field indicating whether the frequency configuration information is applied is set to '1'.

9. The UE according to claim 7, wherein the processor is configured to:
measure first reception power of a downlink signal received from a frequency resource corresponding to the length L from among the received downlink signals; and measure second reception power of a downlink signal received from a frequency resource corresponding to the length R from among the received downlink signals.

10. The UE according to claim 9, wherein the transmitting the HARQ-ACK/NACK for the received downlink signal by the transceiver includes:
   transmitting information about the measured first reception power and the measured second reception power.

11. The UE according to claim 10, wherein:
   the transceiver is configured to receive scheduling information based on the measured first reception power and the measured second reception power.

12. A base station (BS) for transmitting and receiving signals in a wireless communication system comprising:
   a transceiver; and
   a processor,
   wherein the transceiver is configured to:
      transmit frequency configuration information to a user equipment (UE),
      transmit a control channel including downlink control information (DCI) to the UE;
      transmit a downlink signal to the UE based on the DCI; and
      receive hybrid automatic repeat and request acknowledgement/negative-acknowledgement (HARQ-ACK/NACK) for the downlink signal from the UE,
   wherein the frequency configuration information includes:
      information about a length L of a predetermined frequency resource from the lowest frequency at which the downlink signal is transmitted, and
      information about a length R of a predetermined frequency resource from the highest frequency at which the downlink signal is transmitted,
   wherein the DCI includes an index indicating the length L and the length R.

* * * * *